June 7, 1932.  I. SHORT  1,861,941

GEAR CASING

Filed Feb. 5, 1930  2 Sheets-Sheet 1

WITNESS
E. Lutz

INVENTOR
Ira Short
BY
R. B. Reavis
ATTORNEY

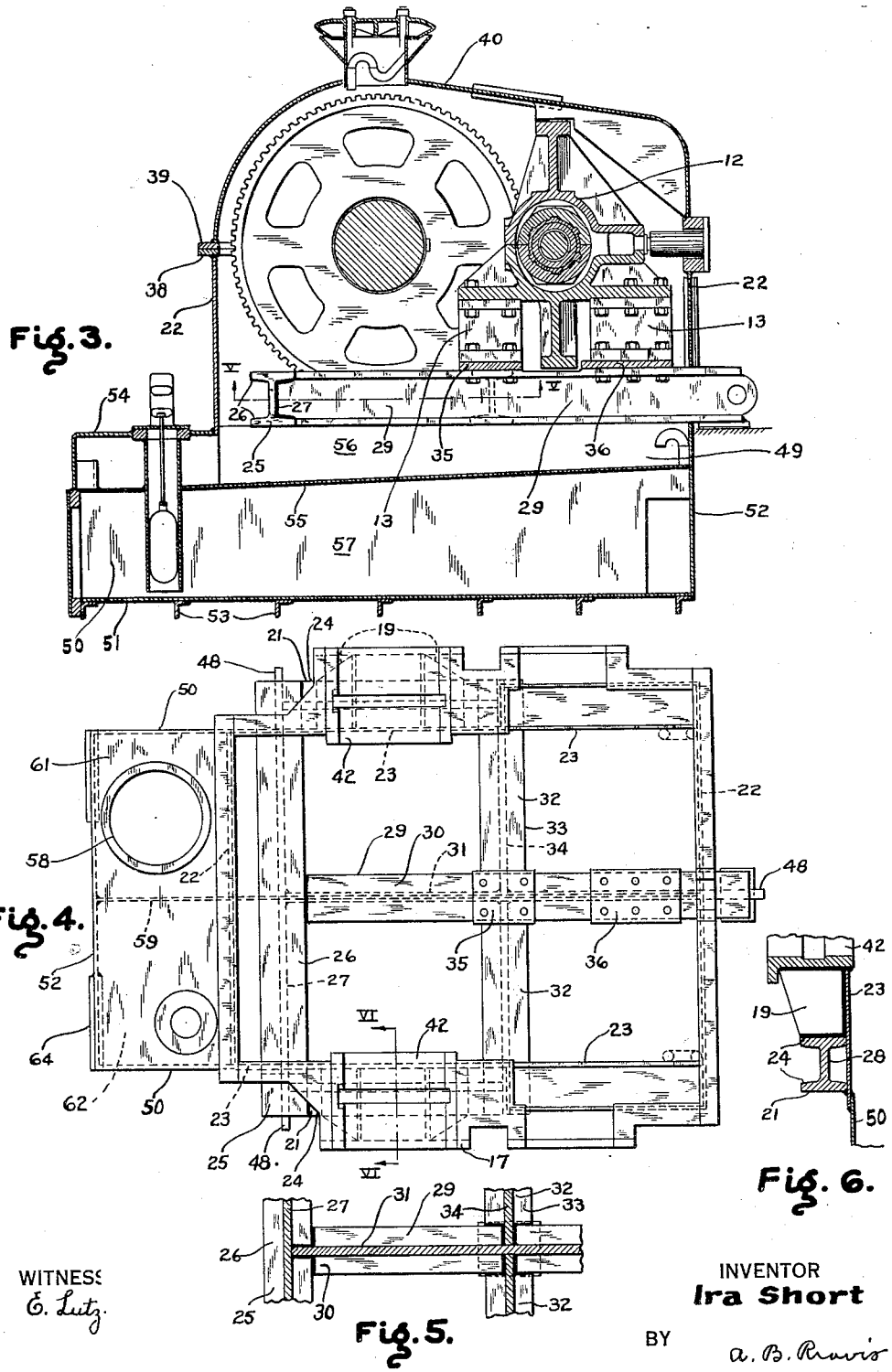

Patented June 7, 1932

1,861,941

UNITED STATES PATENT OFFICE

IRA SHORT, OF ESSINGTON, PENNSYLVANIA, ASSIGNOR TO WESTINGHOUSE ELECTRIC & MANUFACTURING COMPANY A CORPORATION OF PENNSYLVANIA

GEAR CASING

Application filed February 5, 1930. Serial No. 426,143.

My invention relates to reduction gearing, more particularly to that of the marine type, and it has for an object to provide apparatus of this character which is strong and light, to facilitate and to reduce the cost of manufacture thereof, and to make it possible to use better materials for the supporting casing or frame work.

Marine reduction gearing is ordinarily used to reduce the speed of a turbine suitably to drive a propeller. In its simplest form, such gearing consists of a driving pinion connected to the turbine rotor and meshing with a driven gear connected to the propeller. The driven gear is carried by bearings provided in a housing or frame end walls and the pinion may or may not be carried by bearings in such end walls; and, if not, it is usually carried by floating frame, which, in turn, is supported by the housing or frame bottom wall and by one side wall of the latter. It is customary to construct the housing frame so as to hold a thrust bearing for resisting propeller thrusts. The housing or frame has heretofore been cast in lower and upper parts meeting in the plane of the axis of the gear and pinion or in the horizontal plane of the gear axis. The lower part is made amply strong to carry the weight of the gear members and of the housing or frame and to withstand all working stresses, such as those due to the gearing, to the load and to propeller thrusts. Also, the frame must have rigidity to resist distortion that might be caused by weaving of the ship's structure. Provision is ordinarily made at the bottom of the end and side walls of the lower part of the housing or casing for anchoring of the housing to the ship's structure. The cast type of housing construction referred to is unavoidably heavy on account of the weights of moving parts and the working stresses involved; and, in accordance with my invention, I have provided a new type of housing or frame structure consisting of beam, or like, members for withstanding the stresses and plates for enclosing the gearing and to provide a lubricant collection chamber or sump. While the function of the beam, or like, members is principally to give rigidity to the housing and to resist working stresses, they nevertheless also constitute vital parts of the enclosing structure. Also, while the plates serve largely the function of enclosing, they too serve to withstand working stresses. The beam, or like, members and the plates are preferably welded together and constructed and arranged to provide a light and strong housing or frame, one which has the advantage of being made of parts of superior physical properties and one whose manufacture may be facilitated as the component parts are standard and foundry work is unnecessary. The beam, or like, members are preferably arranged so as to provide a bed construction which is supported directly by the ship's structure; and, as the bearings for the gear must be arranged above the bed frame, it is necessary to provide for their support. The gear bearings preferably include strong annular housing constructions, to the bottom portions of which are welded supporting plates which have their lower ends welded to the top flanges of the end beams of the bed construction. The end and side walls of the housing are made of plates of suitable thickness; and, as the bed construction and bearing supports carry the major portion of the load, such plates may be made comparatively thin. Preferably, the end wall plates are welded to the bearing constructions and to the upper flanges of end beams; and the bearing construction supporting plate members are arranged normally with respect to the end plates and are welded at one edge to the latter. Hence, the annular bearing constructions are supported by a composite structure which is strong, stiff and rigid, such composite structures being comprised by welded plate members and end plates and being capable of withstanding working stresses due both to the gearing and to propeller thrusts and of transmitting stresses to the bed construction, particularly to the end beams, which, of course, have great strength in the planes of their webs. Where a floating frame for the pinion is used, the lower portion of the floating frame is preferably supported by the bed construction and by one side wall of the housing, the latter supporting struts which permit of floating movement of the pinion and which resist separation of the pinion from the gear. In addition to stiffness and strength provided by the end beams, the latter members serve to maintain the gear and pinion in meshing relation and to resist stresses tending to separate them. The struts for the floating pinion are carried by a plate side wall and they are preferably located adjacent to the end walls to minimize bending moments imposed on the latter and to provide for the end walls resisting gear and pinion separating forces or stresses in tension. Preferably, the end walls are connected or welded to the inner portions of the bearing constructions and to the inner edges of the upper flanges of the end beams, and the bearing support plate members are arranged outside of the end plates so that they may extend between the bearing constructions and the end beams and may be welded thereto as well as to the end plates. It is, therefore, a further object of my invention to provide a reduction gear having a housing or frame made up of welded parts and having the aforesaid advantageous features of construction.

A further object of my invention is to provide a reduction gear, frame or housing having a bed construction including webbed and flanged structural shapes connected together and carrying suitable supporting means for the gear and pinion bearings.

A further object of my invention is to provide a welded reduction gear, frame or housing having a bed construction including a plurality of webbed and flanged structural shapes welded together with a central webbed and flanged structural shape welded to the side shapes and extending therebeyond to provide for supporting of the pinion.

A further object of my invention is to provide an improved gear housing or frame of the welded type having a bed portion made up of structural shapes welded together and which have their bottom flanges arranged to provide a three-point suspension for the gearing and the housing or frame.

These and other objects are effected by my invention, as will be aparent from the following description and claims, taken in connection with the accompanying drawings, forming a part of this application, in which:

Fig. 3 is a vertical sectional view of the apparatus shown in Fig. 1;

Fig. 4 is a detail plan view showing the bed frame construction made up of structural shapes welded together;

Fig. 5 is a detail sectional view taken along the line V—V of Fig. 3; and,

Fig. 6 is a sectional view taken along the line VI—VI of Fig. 4.

Figure 1:
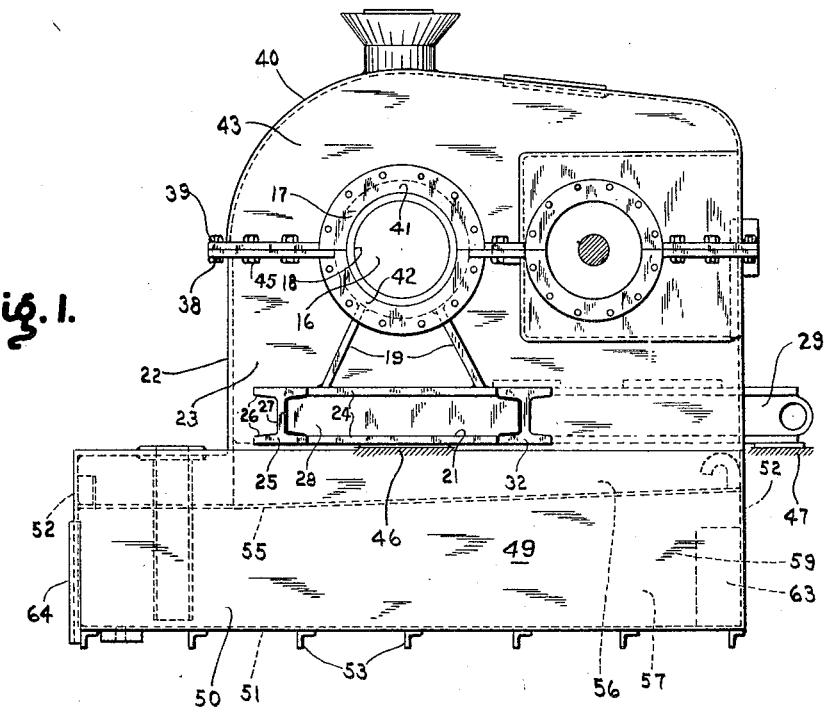
Fig. 1 is a side elevation of my improved reduction gear.
Figure 2:
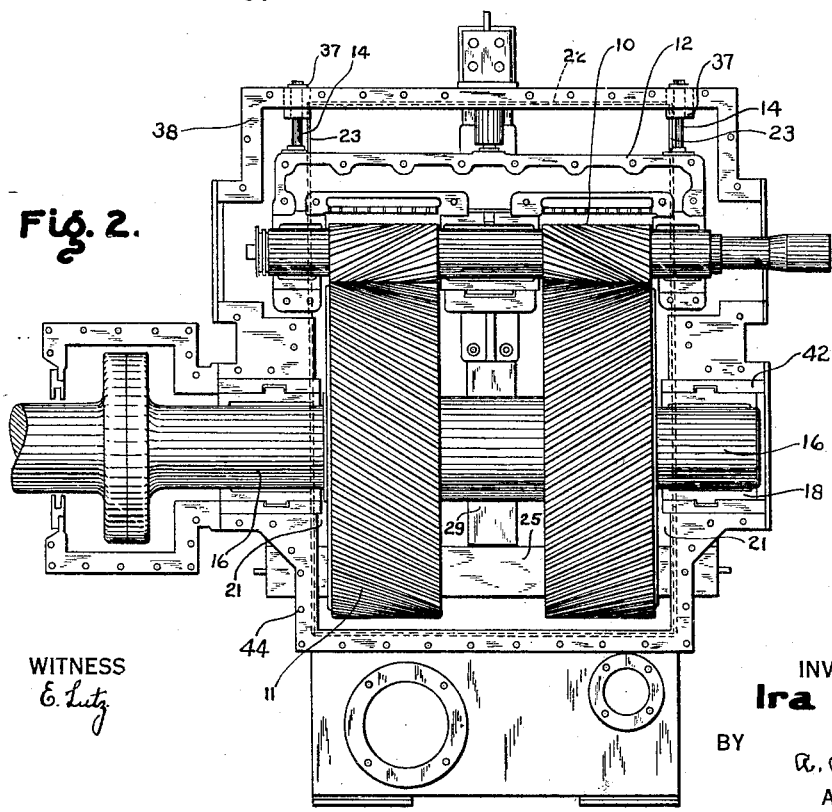
Fig. 2 is a plan view with the cover removed.

Referring now to the drawings more in detail, I show a reduction gear including a pinion 10 meshing with a gear 11. The pinion is arranged to be connected to the rotor of a turbine (not shown) and the gear is connected to a propeller (not shown) in the usual way. The pinion 10 is preferably carried by a floating frame 12 having flexible supporting elements 13 and struts 14 cooperate with the frame to resist separation of the pinion and gear. The gear 11 has journal portions 16 fitting bearing constructions 17 carried by my improved housing or frame construction which will now be discussed.

The housing or frame construction consists generally of a bed frame or construction including rolled, flanged and webbed structural shapes welded together, and the pinion and gear bearings are arranged thereabove and carried by suitable supports which are connected to the bed frame or construction. Where the pinion 10 is carried by a floating frame 12, the latter has its flexible supporting elements 13 connected to the bed frame or construction. The gear bearings 18 are preferably formed as inner parts of the annular bearing constructions 17 which are supported mainly by plate members 19 welded at their upper ends to the bearing constructions and at their lower ends to the upper flanges of the end beams or shapes 21.

The housing for the pinion and gear includes side and end plates 22 and 23, respectively, welded together, the end plates being preferably welded to the inner ends of the bearing constructions 17 and at least to the inner edges of the upper flanges 24 of the end beams or structural shapes 21 and to the inner edges of the plate members 19, the latter being arranged externally of the end plates 23 so as to occupy the space between the bearing constructions 17 and the upper flanges 24 of the end beams or structural shapes.

The end beams or structural shapes 21 are connected by suitable structures including a side beam or structural shape 25 arranged at the side of the gear remote from the pinion. As shown in the drawings, the flanges 26 and web 27 of the side beam or structural shape 25 are welded, respectively, to the adjacent ends of the flanges 24 and webs 28 of the end beams.

Preferably, as also shown in the drawings, a central beam or structural shape 29 has its flanges 30 and its web 31 welded at one end to the sides of the flanges 26 and the web 27 of the side beam 25; and, at the pinion side of the gear 11, there are side beams or structural shapes 32 welded at their adjacent ends to the central beam or structural shape and at their outer ends to the end beams, the side beams 32 preferably having their flanges and webs 33 and 34, respectively, welded laterally to the adjacent flange and web ends 24 and 28 of the end beams 21 and welded at their inner ends to the sides of the flanges and webs 30 and 31, respectively, of the central beam or structural shape 29.

The central beam extends beyond the side beams 32 to provide for supporting of the pinion floating frame 12; and, to this end, I show supporting plates or pads 35 and 36 for inner and outer flexible connections secured to the upper flange of the central beam or structural shape 29, preferably in the region of the connection of the latter with the side beams 32, and outwardly therefrom.

The struts 14 for the floating frame are preferably carried by strengthened supporting portions 37 provided in the side plate 22 and they are located closely adjacent to the end plates 23 so that the latter may serve advantageously to resist in tension gear and pinion separating forces with minimum bending moments imposed upon the side wall or plate 22.

The side and end walls or plates 22 and 23 are welded to flange elements providing an upper flange 38 for cooperation with a mating flange 39 provided on the cover 40, the latter also preferably being made up of welded plate material; however, as the cover does not have to withstand severe working stresses, it may be made relatively light.

The bearing constructions 17 are preferably made up of two semicircular upper and lower parts 41 and 42, the lower part being connected to the end plates 23, to the plate members 19, as already described, and the upper part 41 being connected to the end plates 43 of the cover 40. The casing or housing parts are provided with openings 44 for bolts 45 for holding the casing or housing parts and the bearing constructions together to assure that all working stresses are transmitted through the lower portion of the housing or casing.

The bed frame consists of welded beams or structural shapes and it is preferably so arranged that the lower flanges thereof are situated for attachment to suitable parts of the ship's structure; and, preferably, the bed frame is provided for three-point support by the ship's structure. In the drawings, I show supporting portions 46 arranged beneath the bottom flanges of the end beams 21 and directly below the gear bearings and a supporting portion 47 beneath the bottom flange of the central beam or structural shape 29 and preferably outwardly from the floating frame. Hence, in this way, the three-points of support provide for a rigid connection of the reduction gear to the ship's structure while they, at the same time, avoid distortion of the gear housing or frame incident to the distortion of weaving of the ship's structure. Also, the side beam 25 and the central beam 29 preferably have their webs extended at 48 to provide for attachment of lifting and lowering means.

A liquid collection chamber or sump 49 is preferably arranged immediately below the housing structure just described and it is made up of end plates 50 preferably lap-welded inside of end plates 23 already referred to (see Fig. 6), the end plates 50 preferably extending beyond the housing or frame end plates 23 at one end. The end plates 50 have bottom and side plates 51 and 52 connected thereto preferably by welding and suitable angles 53 are shown below the bottom plate to resist distortion of the latter. The projecting ends of the side plates are covered by a suitable cover plate 54 welded to the end plates 50 and to the adjacent side plate 52.

The chamber so formed by the side, end, bottom and cover plates is divided by an inclined plate or partition 55 into upper and lower compartments 56 and 57, respectively, the upper compartment being a collection compartment; and, due to the inclination of the partition, liquid readily drains to the strainer 58 located in the projecting side portion of the lubricant collection chamber, and passes through the strainer to the lower compartment 57.

The lower compartment 57 is divided by a vertical partition 59 (Fig. 4) into two passes 61 and 62, the pass 61 having the strainer 58 associated therewith at one end, the vertical partition 59 having an opening 63 therein at one end to connect the passes at adjacent ends remote from the strainer and the pass 62 having an outlet 64 at the same end as the strainer. With this arrangement, all of the oil is forced to flow in a series manner from the collection chamber through the strainer and the two passes to suitable apparatus arranged externally of the reduction gear, whereby all of the oil may be uniformly acted upon or cooled and circulating of the oil is prevented.

From the foregoing, it will be apparent that I have devised a reduction gear characterized by a novel type of supporting frame or housing, such supporting frame or housing being made of a bed frame adapted to be supported preferably in a three-point manner with respect to the ship's floor or structure and which carries suitable bearing supports for the gear and the pinion, the gear bearing supports including plate members welded to the upper flanges of the end beams and to the bearing constructions. In addition to the bed construction, the housing or frame includes end and side plates welded together to form an enclosure, the upper edges thereof being welded to a flange which is adapted to mate with a flange or a cover. The end plates also serve the function of constituting part of the gear bearing supporting structures and of supporting the struts, such plates being welded to the bearing portions of the supporting plates and the structure supports in one side plate being arranged closely adjacent to the end plates.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a supporting construction for a marine reduction gear embodying meshing pinion and gear members, the combination of a horizontally stiff fabricated bed construction including flanged and webbed beams welded together, means carried by the bed construction for supporting the pinion member thereabove, a casing for the gearing extending above and below the bed construction and including side and end plates connected to and carried by the bed construction, bearing constructions for the gear member, supports for the bearing constructions including said end plates connected to the bearing construction and plate members arranged normally with respect to the end plates and connected to the bearing constructions, the end plates, and the bed construction, and three-point supporting means for supporting the bed construction by ship's structure.

2. In a supporting construction for a marine reduction gear embodying meshing pinion and gear members, the combination of a fabricated bed construction consisting of beams welded together and constructed and arranged to be supported by the ship's structure, a floating frame carried by the bed construction for supporting the pinion member thereabove, bearing constructions for the gear member, a casing for the gearing including side and end plates connected to the bed construction, the end plates having the bearing constructions connected thereto, means connected to the bearing constructions, the end plates, and the bed construction to provide supports for the bearing constructions, struts cooperating with the floating frame, and supports for the struts carried by one of the side plates and located adjacent to the planes of the end plates.

3. In a supporting construction for a reduction gear embodying meshing pinion and gear members, the combination of a bed construction including a pair of end beams, a beam disposed substantially midway between the end beams and extending beyond the ends of the latter at the pinion member side, a side beam disposed at the side of the gear member remote from the pinion member and welded to the end and central beams, aligned beams disposed at the pinion member side of the gear member and having their adjacent ends welded to the central beam and having their outer ends welded to the end beams, supporting means for the pinion member carried by said central beam, bearing constructions for the gear member, and supports for the bearing constructions carried by said end beams.

4. In a supporting construction for a reduction gear embodying meshing pinion and gear members, the combination of a fabricated bed construction including central and end beams with the central beam extending beyond the ends of the end beams at the pinion member end and transverse beams welded to the central beam and to the end beams, means carried by the central beam for supporting the pinion member, bearing constructions for the gear member, and supports for the bearing constructions each including a plurality of plate members welded to a bearing construction and to the upper flange of an end beam.

5. In a supporting construction for a reduction gear embodying meshing pinion and gear members, the combination of a central beam, a beam disposed at the side of the gear member remote from the pinion member and connected to said central beam, a pair of aligned beams arranged at the pinion member side of said gear member and having their adjacent ends connected to the central beam, end beams arranged substantially parallel to the central beam and having their ends connected to the terminal portions of the beams disposed at either side of the gear member, said central beam extending beyond the end beams at the pinion member side, a floating frame carrying the pinion member and supported by said central beam, bearing constructions for the gear member, supporting means for the bearing constructions carried by said end beams, and three-point supporting means for the reduction gear embodying supporting pads provided underneath the end and central beams below the bearing constructions for the gear member and underneath the central beam.

6. In a supporting construction for a reduction gear embodying meshing pinion and gear members, the combination of a fabricated bed construction including parallel central and end beams with the central beam extending beyond the ends of the end beams at the pinion member end, means carried by the central beam for supporting the pinion member, bearing constructions for the gear member, and supports for the bearing constructions carried by said end beams.

7. In a supporting construction for a reduction gear embodying meshing pinion and gear members, the combination of a fabricated bed construction including central and end beams with the central beam extending beyond the ends of the end beams at the pinion member end, a floating frame carried by the central beams for supporting the pinion member, bearing constructions for the gear member, supports connected to the bearing constructions and to the end beams, a casing including connected end and side plates with the end plates connected to the bearing constructions and to the end beams, struts for the floating frame, and supports for said struts carried by one side plate and each located adjacent to an end plate.

8. In a supporting construction for a reduction gear embodying meshing pinion and gear members, the combination of a fabricated bed construction including central and end beams, means carried by the central beam for supporting the pinion member, bearing constructions for the gear member, supports for the bearing constructions carried by the end beams, and a three-point support for the bed construction including supporting portions provided at the under side of the end beams approximately below said bearing constructions and at the under side of a portion of the central beam at the pinion member side of the gear member.

9. In a supporting construction for a reduction gear embodying meshing pinion and gear members, the combination of a fabricated bed construction including central and end beams with the central beam extending beyond the ends of the end beams at the pinion member end, means carried by the central beam extension for supporting the pinion member, a casing including connected end and side plates with the end plates welded to the inner edges of the top flanges of the end beams, bearing constructions for the gear member and connected to the end plates, reinforcing supporting plates welded, at their upper ends, to the bearing constructions, at their lower ends, to the upper flanges of the end beams and, at one side, to the end plates, and a lubricant collection and sump chamber including end plates welded to the aforesaid end plates.

10. In a marine reduction gear, the combination of a gear, a pinion meshing with the gear and disposed at one side thereof, and a unitary structure for supporting the gear and the pinion and including a floating frame having a central flexible connection with respect to said structure, said supporting structure including three supporting portions for connection to the ship's structure, two of said supporting portions being located substantially at the ends of said gear and the third supporting portion being located at the pinion side of said gear so as to be intersected by the plane of said flexible supporting means.

11. In a supporting construction for a reduction gear embodying meshing pinion and gear members, the combination of a fabricated bed construction including central and end beams connected by transverse beams welded thereto with the central beam extending beyond the ends of the end beams at the pinion member end, a casing including connected end and side plates with the end plates connected to the end beams, a floating frame for the pinion member and carried by the central beam extension, bearing constructions for the gear member, supports for the bearing constructions each including an end plate and a plurality of plate members connected, at one edge, to the end plate, at their upper ends, to a bearing construction and, at their lower ends, to an end beam, struts for the floating frame, and supports for the struts carried by a side plate and arranged respectively adjacent to the end plates.

12. In a supporting construction for a reduction gear embodying meshing pinion and gear members, the combination of a fabricated bed construction including central and end beams connected by transverse beams welded thereto with the central beam extending beyond the ends of the end beams at the pinion member end, a casing including end plates welded to the end beams, a support for the pinion member carried by the central beam extension, bearing constructions for the gear member connected to said end plates, and supports for the bearing constructions each including said end plates and a plurality of plate members arranged normally with respect to the end plate and welded thereto with the upper ends of said plate members welded to the associated bearing construction and with the lower ends thereof welded to the upper flange of an associated end beam.

13. In a marine reduction gear, the combination of a gear, a pinion meshing with the gear and disposed at one side thereof, a unitary supporting structure for supporting the reduction gear from the ship's structure, bearings for the gear carried by said supporting structure, a floating frame for the pinion carried by said supporting structure, means for maintaining the pinion in proper meshing relation with respect to the gear and providing for floating movement of the pinion and its frame, and three supporting portions provided on said unitary supporting structure for supporting the latter from the ship's structure, two of said supporting portions being located approximately below the bearings for the gear and the third supporting portion being spaced inwardly from the first two supporting portions and outwardly therefrom in the direction of said pinion.

In testimony whereof, I have hereunto subscribed my name this 20th day of January, 1930.

IRA SHORT.